B. F. FRITTS.
ELECTRIC FAN SCREEN AND GUARD.
APPLICATION FILED MAR. 19, 1914.
1,114,459. Patented Oct. 20, 1914.
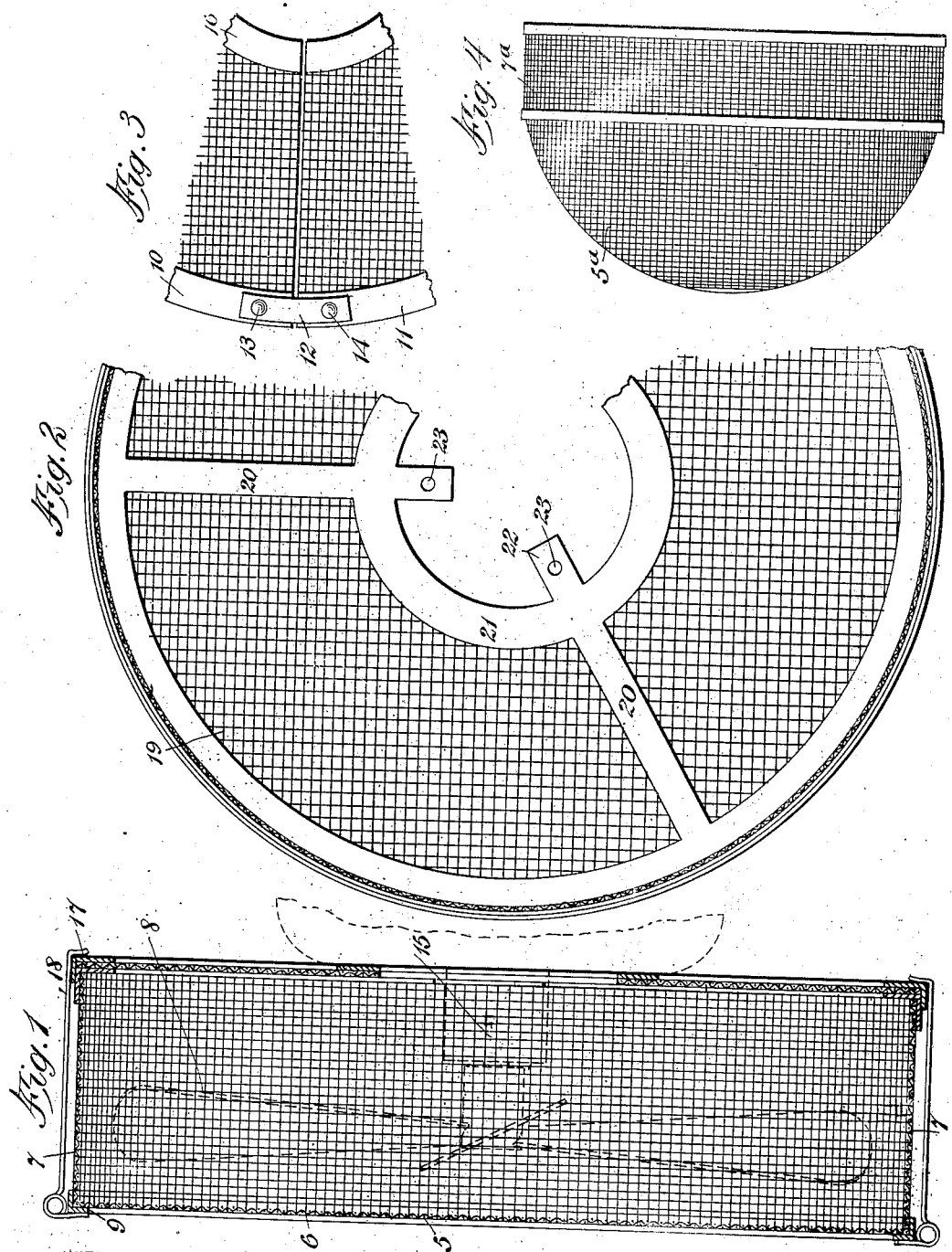
WITNESSES
INVENTOR
Benjamin F. Fritts
BY
ATTORNEYS

UNITED STATES PATENT OFFICE.

BENJAMIN F. FRITTS, OF CHATTANOOGA, TENNESSEE.

ELECTRIC-FAN SCREEN AND GUARD.

1,114,459.   Specification of Letters Patent.   Patented Oct. 20, 1914.

Application filed March 18, 1914. Serial No. 825,538.

*To all whom it may concern:*

Be it known that I, BENJAMIN F. FRITTS, a citizen of the United States, and a resident of Chattanooga, in the county of Hamilton and State of Tennessee, have invented a new and Improved Electric-Fan Screen and Guard, of which the following is a full, clear, and exact description.

My invention has for its object to provide a screen which may be readily attached to an electric fan and which will guard the rear as well as the front and sides of the fan.

The screen is preferably constructed with a front member having rearwardly extending portions so that the front member will guard not only the front of the fan but also the sides of the fan. The rear of the screen which is detachably secured to the extending portions of the front screen member may be permanently secured to the fan motor casing or if desired, this rear screen member may be constructed in sections which are hinged together and which may be disposed around the fan for guarding the rear of the fan when the rear screen member is secured to the rearwardly extending portions of the front screen member.

Additional objects of the invention will appear in the following specification in which the preferred form of my invention is disclosed.

In the drawings similar reference characters refer to similar parts in all the views in which—

Figure 1 is a sectional elevation of the screen showing the parts in section; Fig. 2 is a sectional elevation of the screen showing one form of the rear screen member; Fig. 3 is a fragmentary view showing another form of the rear screen member; and Fig. 4 is a modified form of the invention showing the front screen member with a rounded portion for extending over the front of the fan.

By referring to the drawings it will be seen that the front screen member 5 shown in Fig. 1, has front portions 6 and rearwardly extending side portions 7, the front portions 6 being provided for guarding the front of the fan 8 and the rearwardly extending side portions 7 being provided for guarding the sides of the said fan 8. The said rearwardly extending side portions 7 of the front screen member 5 are preferably connected with the front portions 6 by an annular frame 9. This front screen member 5 may be disposed over the usual wire guard with which electric fans are provided so that the front screen member will be supported by the said wire guard. The rear screen member for guarding the rear of the fan 8 may be constructed in sections 10 and 11 which are united at one side by a link 12 articulated at 13 to the section 10 and articulated at 14 to the section 11 so that the sections 10 and 11 may be moved away from each other to permit the said sections to be again moved together around the fan shaft 15, the rear screen member formed of the sections 10 and 11, when in normal position, having a central opening 16 in which the fan shaft 15 is disposed. When the said rear screen member, formed of the sections 10 and 11 is disposed around the fan shaft 15, the rims of the sections 10 and 11 are engaged by the terminals 17 of the spring hooks 18 which are mounted on the frame 9.

In many cases the screen will be mounted on the fan when it is sold and when the screen is to be used in this way, I prefer to use the rear screen member 19 which is secured to the front screen member 5 in the same manner as is the rear screen formed of the sections 10 and 11, but this rear screen member 19 has inwardly extending arms 20 which project inwardly beyond the circular rim 21 which is disposed around the fan shaft 15. The inwardly extending portions 22 of the arms 20 have orifices 23 in which may be disposed screws for meshing in threaded orifices in the fan motor casing.

In Fig. 4 I show another form 5ª of a front screen member, this front screen member 5ª having rearwardly extending sides 7ª.

Having thus described my invention I claim as new and desire to secure by Letters Patent:

1. In an electric fan screen, a screen member for guarding the front of a fan, a screen member for guarding the rear of the fan and provided with a central opening for a fan shaft, a side screen member secured to one of the first two screen members for guarding the sides of the fan, and means for securing the first and second screen members relatively to each other.

2. In an electric fan screen, a screen member for guarding the front of a fan, a screen member for guarding the rear of the fan and provided with a central opening for a fan shaft, the second mentioned screen member having orifices for registering with threaded orifices in a motor casing, a side screen member secured to one of the first two screen members for guarding the sides of the fan, and means for securing the first and second mentioned screen members relatively to each other.

3. In an electric fan screen, a screen member for guarding the front of a fan and having a rearwardly extending portion for guarding the sides of the fan, a rear screen member in two sections which may be disposed at opposite sides of a fan shaft, and means for holding the sections together and to the rearwardly extending portion of the first screen member.

4. In an electric fan screen, a screen member for guarding the front of a fan and having rearwardly extending portions for guarding the sides of the fan, a rear screen member in two sections united together so that the rear screen member may be disposed around a fan shaft, and means for holding the sections together and to the rearwardly extending portions of the first screen member.

In witness whereof I have signed my name to this specification in the presence of the two subscribing witnesses.

BENJAMIN F. FRITTS.

Witnesses:
 Tom. O. Duff,
 Eugene B. Wilkey.